United States Patent [19]
Matsuura et al.

[11] Patent Number: 4,741,299
[45] Date of Patent: May 3, 1988

[54] INTERNAL COMBUSTION ENGINE

[75] Inventors: Masaaki Matsuura, Tokyo; Masaharu Nakamori, Asaka; Shoichi Honda, Tokyo; Yoichi Ishida, Niiza; Tetsuya Nakanishi, Ohmiya, all of Japan

[73] Assignee: Honda Giken Kogyo Kabushiki Kaisha, Japan

[21] Appl. No.: 821,166

[22] Filed: Jan. 21, 1986

[30] Foreign Application Priority Data

Jan. 26, 1985 [JP] Japan .................. 60-13192
Jan. 26, 1985 [JP] Japan .................. 60-13193
Jan. 26, 1985 [JP] Japan .................. 60-9294[U]

[51] Int. Cl.$^4$ ............................................. F01L 1/04
[52] U.S. Cl. .................. 123/90.31; 123/90.27; 123/90.33; 474/110; 474/111
[58] Field of Search .............. 123/90.27, 90.31, 90.15, 123/90.17, 90.33; 474/110, 111, 136

[56] References Cited

U.S. PATENT DOCUMENTS

| | | | |
|---|---|---|---|
| 2,191,946 | 2/1940 | Weller | 474/111 |
| 3,599,506 | 8/1971 | Freese | 474/110 |
| 3,964,331 | 6/1976 | Oldfield | 474/110 |
| 4,480,603 | 11/1984 | Tsuboi | 123/90.31 |
| 4,503,681 | 7/1985 | Kurata et al. | 474/111 |
| 4,507,103 | 3/1985 | Mittermeier | 474/111 |
| 4,553,509 | 11/1985 | Mezger et al. | 123/90.27 |

FOREIGN PATENT DOCUMENTS 3211095 10/1982 Fed. Rep. of Germany ...... 474/111
2065265 6/1981 United Kingdom ................ 474/111

Primary Examiner—Ira S. Lazarus
Attorney, Agent, or Firm—Darby & Darby

[57] ABSTRACT

An internal combustion engine includes an engine body having a chamber and an endless transmission member extended around and operatively engaged with a crankshaft and a cam shaft to transmit a rotation of the crankshaft to the cam shaft, the endless transmission member being movable along a closed path of travel in the chamber. A hollow mounting member is disposed in the chamber and has an upper open end and a lower tubular portion. The mounting member is fixed to the engine body through fastening elements secured to an upper portion of a peripheral wall of the mounting member. A tensioner device is disposed in the chamber and includes a tensioner member movably mounted on the engine body, and a hydraulic lock mechanism including a hollow cylinder and a plunger slidably received in the cylinder to define a hydraulic chamber in the cylinder. The cylinder is received in the hollow mounting member and snugly fitted in the lower tubular portion of the mounting member against movement. The mounting member and the cylinder defines an oil reservoir for holding oil therein, the hydraulic lock mechanism having passage through which the oil reservoir is in fluid communication with the hydraulic chamber. A check valve is connected to the passage for blocking it to prevent the plunger from moving in one direction along the cylinder. The plunger is movable in the other direction and operatively engaged with the tensioner member to hold it in sliding contact with the cam chain.

3 Claims, 3 Drawing Sheets

INTERNAL COMBUSTION ENGINE

BACKGROUND OF THE INVENTION

1. Field of the Invention

This invention relates generally to an internal combustion engine and more particularly to such an engine incorporating tensioner means for automatically tensing a cam chain or the like which operatively connects a crankshaft and a camshaft together for operating intake and exhaust valves.

2. Prior Art

Japanese patent application Laid-Open (Kokai) No. 59-208250 discloses one conventional tensioner for keeping a cam chain or timing chain taut, the tensioner comprising a hydraulic lock mechanism for urging a tensioner member into sliding contact with an outer periphery of the endless cam chain which is extended around and engaged with a first sprocket on a crankshaft and a second sprocket on a camshaft. The hydraulic lock mechanism allows the tensioner member to be moved toward the cam chain but prevents it from being moved away from the cam chain under the influence of hydraulic pressure. The tensioner comprises a mounting member for mounting the hydraulic lock mechanism on an engine body, the mounting member having an oil reservoir from which oil is fed to the hydraulic lock mechanism. More specifically, the mounting member of a one-piece cast construction has an upwardly-opening well, serving as the oil reservoir, and a vertically-disposed bore disposed adjacent to the well. The hydraulic lock mechanism comprises a cylinder received in the bore and a hollow plunger received in the cylinder for sliding movement therealong. A hydraulic chamber is formed at a lower portion of the cylinder extending between the bottom of the plunger and the bottom of the cylinder. The oil is fed from the oil reservoir to the hydraulic chamber via a passage extending through the peripheral walls of the cylinder and plunger, the interior of the hollow plunger and a valve port formed through the bottom of the plunger. A spring is received within the hydraulic chamber and acts on the bottom of the plunger to urge it upwardly. A check valve element in the form of a ball is also received in the hydraulic chamber and normally closes the valve port under the influence of the hydraulic pressure in the hydraulic chamber. An upper end of the plunger is urged against one arm of a pivotal bell-crank lever under the influence of the spring while the other arm of this lever is urged against the tensioner member to keep the cam chain taut. When the cam chain becomes loose, the plunger is moved upwardly, so that the pressure in the hydraulic chamber is reduced to create a pressure differential between the interior of the hollow plunger and the hydraulic chamber. As a result, the check valve element is moved away from the valve port to supply the oil to the hydraulic chamber from the oil reservoir. On the other hand, when the cam chain is subjected to an undue pulling force, the plunger tends to be moved downwardly. However, this downward movement is prevented by the check valve element.

The mounting member is secured to the engine body by bolts at upper and lower portions thereof. Lubricating oil is caused to drop into the upwardly-opening oil reservoir after it lubricates the second sprocket mounted on the cam shaft. Since the mounting member is cast of metal, the wall thickness thereof is relatively large, and therefore the upwardlydirected opening of the oil reservoir is of a relatively small size. Therefore, there is the possibilities that the oil is not sufficiently fed to the hydraulic lock mechanism. It is considered to form the mounting member by processing a metal sheet. However, the oil reservoir or well is subjected to deformation when the mounting member is secured to the engine body by bolts. The deformation of the mounting member also causes the deformation of the hydraulic lock mechanism. In addition, although the hydraulic lock mechanism and the mounting member are disposed within a closed path of travel of the cam chain, the bell-crank lever is disposed outside this closed path of travel of the cam chain, which increases the size of the engine

SUMMARY OF THE INVENTION

It is therefore an object of this invention to provide an internal combustion engine including cam chain tensioner means of the type which can render the engine compact and incorporates a hydraulic lock mechanism which is reliable in operation.

According to the present invention, there is provided an internal combustion engine comprising:

(a) an engine body having a chamber;

(b) a crankshaft rotatably mounted on said engine body;

(c) a camshaft rotatably mounted on said engine body;

(d) an endless transmission member extended around and operatively engaged with said crankshaft and said cam shaft to transmit a rotation of said crankshaft to said cam shaft, said endless transmission member being movable along a closed path of travel in said chamber;

(e) a hollow mounting member disposed in said chamber and having an upper open end, a lower end and a peripheral wall extending between said upper and lower ends, a lower portion of said mounting member being formed into a tubular shape, said mounting member being fixed to said engine body through fastening means secured to an upper portion of said peripheral wall; and (f) tensioner means disposed in said chamber and comprising a tensioner member movably mounted on said engine body, and a hydraulic lock mechanism comprising a hollow cylinder and a plunger slidably received in said cylinder to define a hydraulic chamber in said cylinder, said cylinder being received in said hollow mounting member and snugly fitted in said lower tubular portion of said mounting member against movement, said mounting member and said cylinder defining an oil reservoir for holding oil therein, said hydraulic lock mechanism having passage means through which said oil reservoir is in fluid communication with said hydraulic chamber, check valve means being connected to said passage means for blocking it to prevent said plunger from moving in one direction along said cylinder, and said plunger being movable in the other direction and operatively engaged with said tensioner member to hold it in sliding contact with said cam chain.

DESCRIPTION OF THE PREFERRED EMBODIMENTS OF THE INVENTION

Figure 1:
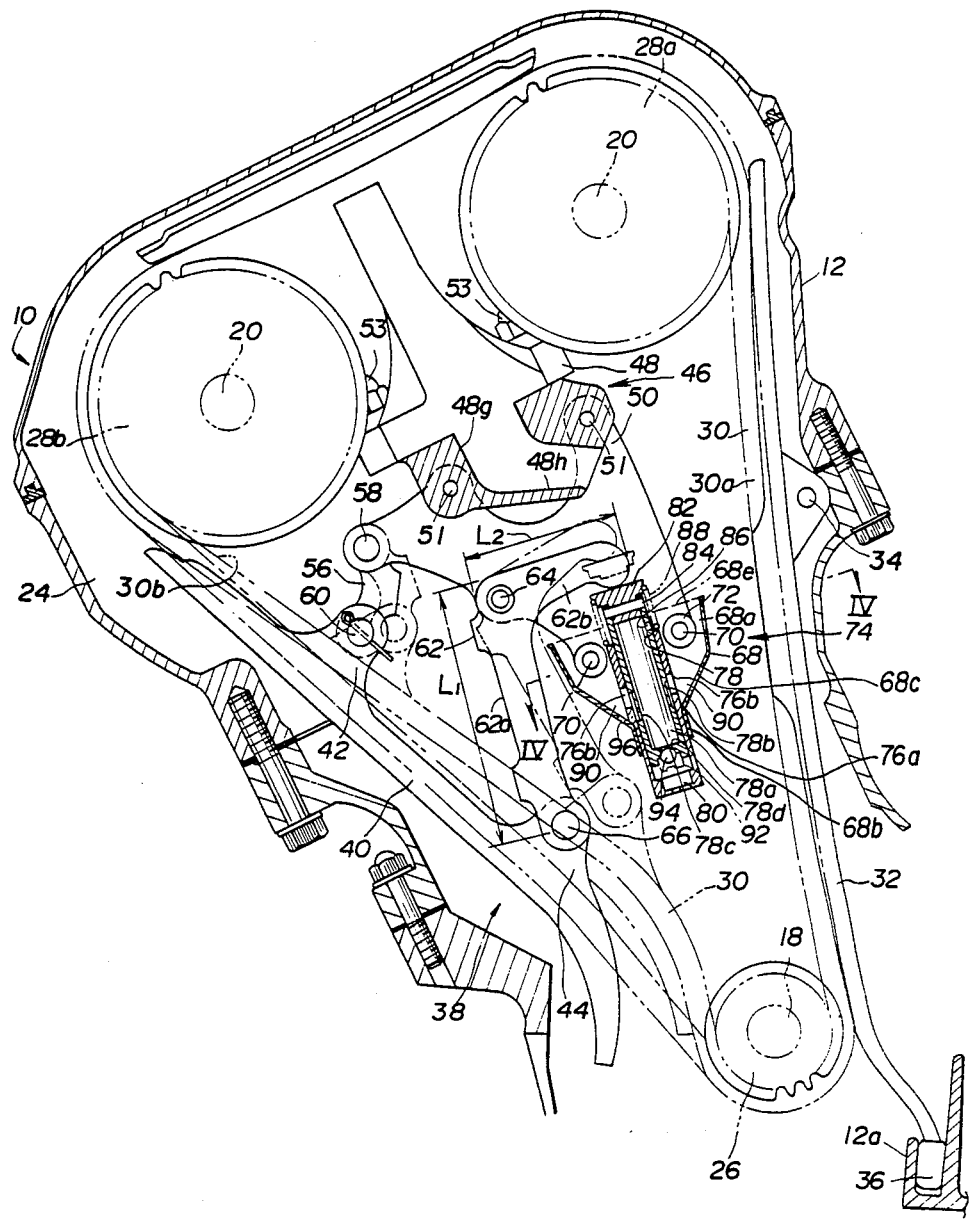
FIG. 1 is a cross-sectional view of an internal combustion engine provided in accordance with the present invention.
Figure 2:
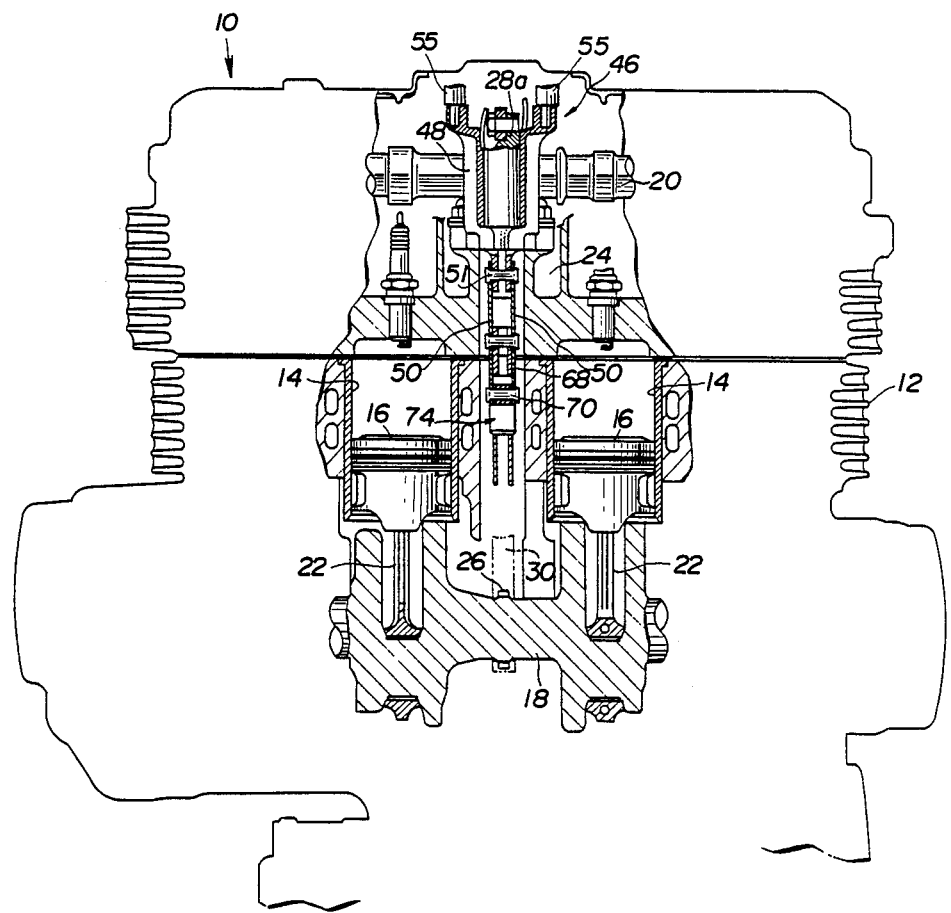
FIG. 2 is a partly-broken front elevational view of the engine.

FIGS. 1 and 2 show a four-cycle internal combustion engine 10 which comprises an engine body 12 having a plurality of cylinders 14 in which a plurality of pistons 16 are received, respectively, for reciprocal movement therealong. A crankshaft 18 and a pair of camshafts 20 and 20 are rotatably mounted on the engine body 12 in parallel relation to each other. The pistons 16 are connected to the crankshaft 18 via respective connecting rods 22 as is well known in the art. A chamber 24 of a relatively small width is provided in the engine body 12 and is disposed perpendicular to the crankshaft 18 and the camshafts 20. A first sprocket 26 is fixedly mounted on the crankshaft 18 for rotation therewith, and a pair of second sprockets 28a and 28b are fixedly mounted on the pair of camshafts 20, respectively. The first and second sprockets 26 and 28a, 28b are disposed in the chamber 24. An endless transmission member 30 in the form of a cam chain is extended around and engaged with the first and second sprockets 26 and 28a, 28b, and is movable along a closed path of travel in the chamber 24. As is well known, upon rotation of the crankshaft 18, the cam chain 30 is driven to be moved along the path of travel to rotate the pair of camshafts 20.

An elongated chain guide member 32 is mounted on the engine body 12 by a pin 34 intermediate opposite ends thereof and is received in a channel-shaped support portion 12a of the engine body 12 via a resilient element 36, the guide member 32 being held in sliding contact with an outer side of a tension portion 30a of the cam chain 30 lying between the first sprocket 26 and the second sprocket 28a.

Tensioner means 38 for tensing the cam chain 30 will now be described. An elongated tensioner member 40 is disposed in a plane in which the path of travel of the cam chain 30 lies, and is urged into sliding contact with an outer side of a loose portion 30b of the cam chain 30 lying between the second sprocket 28b and the first sprocket 26. The tensioner member 40 has a pair of first and second projections 42 and 44 formed on opposite end portions thereof and extending from an inner surface thereof into the closed path of travel of the cam chain 30, the first and second projections 42 and 44 being disposed on opposite sides of the cam chain 30.

Figure 3:
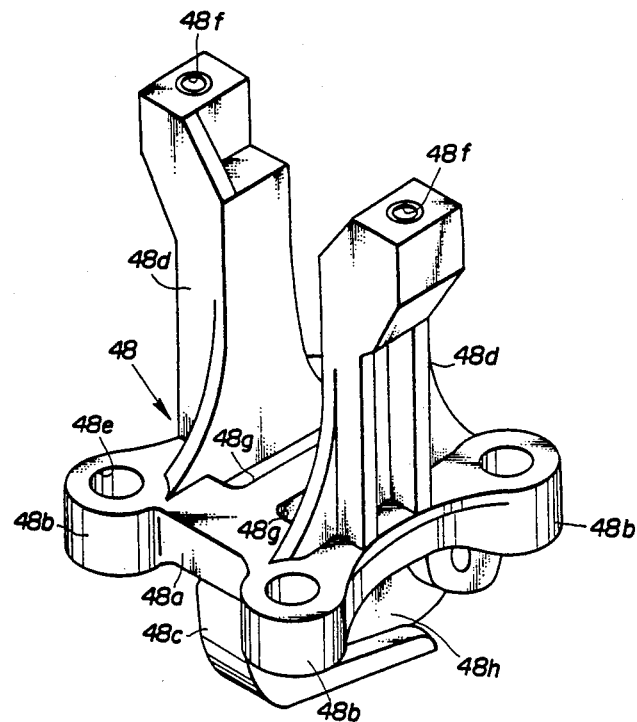
FIG. 3 is a perspective view of a top bridge.

Tensioner hanger means 46 comprises a top bridge or upper hanger member 48 detachably secured to the engine body 12, and a pair of parallel opposed hanger plates or lower hanger members 50 secured to the top bridge 48, the tensioner hanger means 46 being disposed inside the closed path of travel of the cam chain 30. As best shown in FIG. 3, the top bridge 48 includes a generally-square base 48a having a boss 48b at each of four corners thereof, a lower portion 48c extending downwardly from the base 48a, and a pair of opposed posts 48d extending upwardly from the base 48a. The pair of hanger plates 50 are secured to the opposite sides of the lower portion 48c by rivets 51. Each of the four boss 48b has a hole 48e formed therethrough into which a bolt 53 is threaded to secured the top bridge 48 to the engine body 12, and each of the posts 48d has in an upper end thereof an internally-threaded holes 48f into which a bolt 55 is threaded to secured it to the engine body 12. A pair of juxtaposed rectangular ports 48g are formed through the base 48a, and a pair of grooves 48h only one of which is shown in FIG. 3 are formed in opposite sides of the lower portion 48c. The pair of grooves 48h slant downwardly and communicate with the pair of ports 48g, respectively, at their upper ends. The top bridge 48 is disposed between the second sprockets 28a and 28b beneath path of travel of the cam chain 30. Lubricating oil is caused to drop from the cam chain 30 into the rectangular ports 48g and fed to the grooves 48h. Thus, the ports 48g and the grooves 48h constitute oil feed passage means, and the upwardly-opening upper end of each port 48g serves as an inlet of the oil feed passage means, and the lower end of each groove 48h serves as an outlet of the oil feed passage means.

A lever 56 is pivotally connected at one end to the opposed hanger plates 50 by a pin 58, and the other end of the lever 56 is hingedly connected to the first projection 42 of the tensioner member 40 by a pin 60. An L-shaped bell-crank lever 62 has a pair of perpendicularly-disposed first and second arms 62a and 62b, the bell-crank lever 62 being pivotally connected to the opposed hanger plates 50 by a pin 64 disposed at a level below the pivot pin 58 and passing a corner portion of the bell-crank lever 62 into which the first and second arms 62a and 62b merge. The length L1 of the first arm 62a is greater than the length L2 of the second arm 62b. The first arm 62a is disposed generally vertically and is hingedly connected to the second projection 44 of the tensioner member 40 by a pin 66. The pin 60 serves as an axis of pivotal movement of the tensioner member 40. The lever 56 and the bell-crank lever 62 are both disposed inside the closed path of travel of the cam chain 30.

Figure 4:
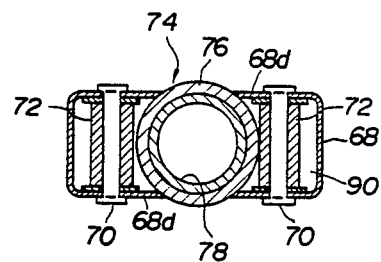
FIG. 4 is a cross-sectional view of the engine taken along the line IV—IV of FIG. 1.

A mounting member 68 is provided for supporting a hydraulic lock mechanism 74 as later described, and is secured to the lower portions of the opposed hanger plates 50 and 50 by a pair of fastening elements 70 and 70 in the form of rivets. The mounting member 68 has upper and lower open ends and a peripheral wall extending therebetween. More specifically, the mounting member 68 has an upper portion 68a of a rectangular shape, a lower tubular portion 68b and an intermediate portion 68c interconnecting the upper and lower portions 68a and 68b. The mounting member 68 is made of metal sheet. As best shown in FIG. 4, the pair of rivets 70 extend through opposed side walls 68d of the upper portion 68a and respective collars 72 and 72 interposed therebetween. The rectangular upper open end 68e of the mounting member 68 is disposed generally in a plane in which the cam chain 30 is disposed, this upper open end being disposed generally in vertical registry with the lower ends of the grooves 48h of the top bridge 48.

The hydraulic lock mechanism 74 is provided for holding the tensioner member 40 in sliding contact with the cam chain 30 in a manner to allow the tensioner member 40 to be moved toward the cam chain 30 but to prevent it from being moved away from the cam chain 30 under the influence of hydraulic pressure.

The hydraulic lock mechanism 74 comprises a hollow cylinder 76 received in the hollow mounting member 68, and a hollow plunger 78 received in the cylinder 76 for sliding movement therealong. The cylinder 76 is disposed between the pair of rivets 70 and 70. A lower portion of the cylinder 76 is reduced in outer diameter to provide a peripheral shoulder 76a, and the lower portion of a reduced diameter is snugly fitted in and extends through the tubular portion 68b of the mounting portion 68 with the shoulder 76a engaging the lower end of the intermediate portion 68c adjacent to the tubular portion 68b. Thus, the cylinder 76 is held against movement relative to the mounting member 68. A hydraulic chamber 80 is formed at a lower portion of the cylinder 76 extending between the bottom of the plunger 78 and the bottom of the cylinder 76. A plug 82 is fitted in an upper open end of the plunger 78 and secured thereto by a pin 84. A vent hole 86 is formed through the peripheral wall of the plunger 78 adjacent to its upper end to communicate the interior 78a of the hollow plunger 78 with the chamber 24. A compression coil spring 88 is arranged around the plunger 78 and acts between the plug 82 and the upper end of the cylinder 76 to urge the plug 82 against the distal end of the second arm 62b of the bell-crank lever 62.

The upper and intermediate portions 68a and 68c of the hollow mounting member 68 cooperate with the cylinder 76 to define an oil reservoir 90 to which the oil is fed by gravity from the top bridge 48 via its oil passage means and the upper open end 68a of the mounting member 68. The cylinder 76 has circumferentially-spaced ports 76b disposed intermediate the upper end thereof and the tubular portion 68b of the mounting member 68, and the plunger 78 has a peripheral recess 78b therearound and a port 78c. The oil reservoir 90 is in communication with the interior 78a of the hollow plunger 78 via the ports 76b, the peripheral recess 78b and the port 78c. A valve port 78d is formed through the bottom of the plunger 78. A valve cage 92 is mounted within the hydraulic chamber 80 and secured to the bottom of the plunger 78 for receiving a valve element 94 in the form of a ball. The valve element 94 and the bottom of the plunger 78 having the valve port 78d constitutes a check valve. At least one aperture 96 is formed through the intermediate portion 68c of the mounting member 68 at a level below the ports 76b so that foreign matters such as iron scales contained in the oil in the oil reservoir 90 is suitably discharged from the aperture 96.

A mode of operation of the engine 10 will now be described. First, the same oil as the lubricating oil to be fed to the cam chain 30 is applied to the oil reservoir 90, the interior 78a of the plunger 78 and the hydraulic chamber 80. Thereafter, during the operation of the engine 10, part of the lubricating oil applied to the cam chain 30 is caused to be fed to the top bridge 48, so that the oil passes through the rectangular ports 48g and the grooves 48h and drops to the oil reservoir 90. The coil spring 88 urges the bell-crank lever 62 via the plug 82 to angularly move about the pin 64 in a counterclockwise direction (FIG. 1), so that the tensioner member 40 is urged against the outer side of the loose portion 30b of the cam chain 30, thereby keeping the cam chain taut. When the cam chain 30 is elongated or stretched longitudinally to become loose, the tensioner member 40 is moved inwardly toward the bell-crank lever 64 under the influence of the coil spring 88 to absorb such loosening of the cam chain 30. At this time, the plunger 78 is moved upwardly since it is coupled to the plug 82 via the pin 84. As a result, the pressure in the hydraulic chamber 80 is reduced to create a pressure differential between the interior 78a of the plunger 78 and the hydraulic chamber 80 whereupon the ball valve element 94 is moved away from the valve port 78d to open the check valve, so that the oil is introduced into the hydraulic chamber 80 from the interior 78a of the plunger 78 via the valve port 78c. By virtue of the provision of the check valve, even when the cam chain 30 is subjected to a pulling force at its loose side 30b due to torque variations, the hydraulic lock mechanism 74 prevents the tensioner member 40 from moving outwardly through the bell-crank lever 62.

The mounting member 68 is made of a metal sheet and therefore has a relatively small wall thickness, and therefore the upper open end 68a of the oil reservoir 90 can be increased in size, so that a required amount of oil can be fed to the hydraulic lock mechanism 74. When the mounting member 68 is secured to the hanger plates 50 by the rivets 70, the upper portion 68a may be subjected to a slight deformation, but the lower tubular portion 68c holding the cylinder 76 is not subjected to deformation. Therefore, the operation of the hydraulic lock mechanism 74 is not affected by the use of the rivets 70. The mounting member 68 is fixed relative to the engine body 12 through the tensioner hanger means 46 comprising the top bridge 48 and the hanger plates 50. The top bridge 48 is detachably bolted to the engine body 12. With this arrangement, when it is desired to mount the mounting member 68 on a different type of an engine, this can suitably be done only by using a modified top bridge.

Since the first arm 62a of the bell-crank lever 62 is longer than the second arm 62b, the plunger 78 of the hydraulic lock mechanism 74 has only to be moved upwardly slightly when the tensioner member 40 is moved or displaced inwardly toward the hydraulic lock mechanism 74. Therefore, the stroke of the plunger 78 can be set small, and hence the hydraulic lock mechanism can be of a compact size.

What is claimed is:
1. An internal combustion engine comprising:
 (a) an engine body having a chamber;
 (b) a crankshaft rotatably mounted on said engine body;
 (c) a camshaft rotatably mounted on said engine body;
 (d) an oil lubricated endless transmission member extended around and operatively engaged with said crankshaft and said camshaft, said endless transmission member being movable along a closed path of travel in said chamber;
 (e) a tensioner hanger comprising an upper hanger member detachably secured to said engine body and a lower hanger member secured at an upper portion thereof to said upper hanger member, said upper hanger member having oil passage means adapted to receive lubrication oil from the endless transmission member at an inlet and guide said oil downwardly therethrough to an outlet;
 (f) a hollow mounting member affixed at an upper portion thereof to a lower portion of the lower hanger member of said tensioner hanger, said mounting member having upper and lower ends with a peripheral wall extending between said ends, said upper end opening under the outlet of said oil passage means for receiving oil therefrom, and said lower end being tapered into a tubular shape;
 (g) a hydraulic lock mechanism comprising a hollow cylinder and a plunger slidably received in said cylinder to define a hydraulic chamber in said cylinder, said cylinder being received in said hollow mounting member and sealably engaging said lower tubular portion of said hollow mounting member;
 (h) a replenishable oil reservoir defined by a funnel-shaped space between said mounting member and said cylinder for receiving oil from said oil passage means and for holding the oil received therein, said oil reservoir being in selective fluid communication with said hydraulic chamber via conduit means, check valve means being connected to said conduit means for selectively permitting the plunger to move in only one direction; and (i) a tensioner member movably attached to said engine body and operatively engaged with said plunger, thereby maintaining said plunger in sliding contact with said endless transmission member, said plunger thrusting against said endless transmission member as the plunger moves in said one direction.

2. An internal combustion engine according to claim 1, in which said plunger is operatively engaged with said tensioner member through a generally L-shaped lever pivotally mounted on said engine body and having a first and a second arm, said tensioner member having at one end portion an axis of pivotal movement, said first arm of said lever being hingedly connected at its distal end to the other end portion of said tensioner member while said second arm is operatively engaged with said plunger at its distal end, said axis of pivotal movement, said lever and said hydraulic lock mechanism being disposed inside the closed path of travel of said cam chain.

3. An internal combustion engine according to claim 2, in which said first arm of said lever is longer than said second arm.

* * * * *